Dec. 5, 1939.  H. A. S. HOWARTH  2,182,539
RADIAL BEARING
Filed Feb. 24, 1937  8 Sheets-Sheet 1

Fig. 1.

Inventor

Harry A. S. Howarth.

By Cameron, Kerkam + Sutton
Attorneys

Dec. 5, 1939.　　H. A. S. HOWARTH　　2,182,539
RADIAL BEARING
Filed Feb. 24, 1937　　8 Sheets-Sheet 2

Fig. 2.

Inventor
Harry A. S. Howarth.
By Cameron, Kerkam & Sutton
Attorneys

Dec. 5, 1939.  H. A. S. HOWARTH  2,182,539
RADIAL BEARING
Filed Feb. 24, 1937   8 Sheets-Sheet 3

Inventor
Harry A. S. Howarth.
By Cameron, Kerkam + Sutton
Attorneys

Dec. 5, 1939.  H. A. S. HOWARTH  2,182,539
RADIAL BEARING
Filed Feb. 24, 1937    8 Sheets-Sheet 4

Inventor
Harry A. S. Howarth.

By Cameron, Kerkam + Sutton
Attorneys

Dec. 5, 1939.  H. A. S. HOWARTH  2,182,539
RADIAL BEARING
Filed Feb. 24, 1937  8 Sheets-Sheet 5

Inventor
Harry A. S. Howarth.
By Cameron, Kerkam + Sutton
Attorneys

Dec. 5, 1939.   H. A. S. HOWARTH   2,182,539
RADIAL BEARING
Filed Feb. 24, 1937   8 Sheets-Sheet 6

Inventor
Harry A. S. Howarth.
By Cameron, Kerkam + Sutton
Attorneys

Dec. 5, 1939.  H. A. S. HOWARTH  2,182,539
RADIAL BEARING
Filed Feb. 24, 1937   8 Sheets-Sheet 7

Inventor
Harry A. S. Howarth.

By Cameron, Kerkam + Sutton
Attorneys

Dec. 5, 1939.  H. A. S. HOWARTH  2,182,539
RADIAL BEARING
Filed Feb. 24, 1937  8 Sheets-Sheet 8

Inventor
Harry A. S. Howarth.

By Cameron, Kerkam + Sutton
Attorneys

Patented Dec. 5, 1939

2,182,539

UNITED STATES PATENT OFFICE 2,182,539

RADIAL BEARING

Harry A. S. Howarth, Philadelphia, Pa., assignor to Kingsbury Machine Works, Inc., Philadelphia, Pa., a corporation of Delaware Application February 24, 1937, Serial No. 127,552

25 Claims. (Cl. 308—74)

This invention relates to radial bearings, and more particularly to radial bearings provided with improved mounting means for the radial bearing shell.

In my application Serial No. 36,914, filed August 19, 1935, and entitled Radial bearings, of which this application is a continuation in part, I have disclosed and claimed a radial bearing wherein the bearing shell is provided with axial flexibility and circumferential rigidity by means of axially spaced circumferentially extending ribs, said shell being mounted, either with or without the interposition of a saddle ring, in a mounting which provides for axial flexing of said shell with or without provision for self-aligning movements of the shell as a unit with respect to its mounting as by means of spherical surfaces concentric with the axis of the shaft and provided on said mounting and on the shell or its saddle ring. The present invention is particularly concerned with mounting means for shells of the type disclosed and claimed in the aforesaid application, although in its broader aspects some of the features of the present invention are susceptible of embodiment in radial bearings employing radial bearing shells of other form or construction.

It is an object of the present invention to provide a mounting of the type referred to which facilitates the standardization of such mountings, particularly for heavy duty radial bearings.

Another object of this invention is to provide a mounting of the type referred to which facilitates the use of a bearing shell which is composed of upper and lower duplicated halves so as to simplify production and also replacements when necessary.

Another object of this invention is to provide a mounting of the type referred to which also facilitates the use of lubricating means that do not interfere with the use of radial bearing shells having duplicated upper and lower halves.

Another object of this invention is to provide a mounting of the type referred to which facilitates the use of lubricating means that supply copious quantities of oil to the radial bearing surfaces without involving any reduction in the bearing area thereof or decrease in the load carrying capacity of the bearing shell.

Another object of this invention is to provide a mounting of the type referred to which may also include spherical surfaces arranged concentrically with the axis of the shaft and cooperating with a spherical surface provided by ribs on the bearing shell or on a saddle ring to facilitate alignment of the shaft.

Another object of this invention is to provide a mouting of the type referred to which may also include a saddle ring having cylindrical or spherical surfaces of engagement with ribs on the bearing shell and a cylindrical or spherical surface of engagement with the mounting means.

Another object of this invention is to provide a mounting of the type referred to which may be readily provided with closure means for preventing escape of oil along the shaft.

Another object of this invention is to provide a mounting of the type referred to with improved means for interlocking the cap of the mounting with the base thereof.

Another object of this invention is to provide a mounting of the type last characterized which includes a cylindrical fit between the cap and base of the mounting, said cylindrical fit having an axis which is at right angles to the axis of the shaft.

Another object of this invention is to provide a mounting for radial bearings having circumferentially-ribbed axially flexible shells which involves a cylindrical fit between the base and the cap of the mounting, whether or not the shell has a spherical mounting therein, and if a spherical mounting is used, whether the same is provided by the interaction of the mounting with ribs on the shell or with a saddle ring interposed between the mounting and shell and, if a spherical mounting is not used, whether the mounting coacts directly with the ribs on the shell or through the intermediation of a saddle ring therebetween.

Another object of this invention is to provide a radial bearing with improved mounting means which assures that lateral loads on the cap of the mounting shall be transmitted to the base of the mounting with minimum likelihood of distortion of the mounting.

Another object of this invention is to provide an improved mounting for radial bearings which facilitates standardization both of the mounting means and of the contained radial bearing elements.

Another object of this invention is to provide an improved mounting for radial bearings which is simple in construction and strong, rigid and durable in service.

Other objects will appear as the description of the invention proceeds.

The invention is capable of receiving a variety of mechanical expressions, some of which are shown on the accompanying drawings, but it is to be expressly understood that the drawings are for purposes of illustration only, and are not to be considered as a definition of the limits of the invention, reference being had to the appended claims for that purpose.

Referring in detail to the drawings, wherein the same reference characters are employed to designate corresponding parts in the several figures—

While only some of the forms and arrangements of ribbed bearing shells, with or without a saddle ring interposed between said shell and the mounting and having the shell supported either at the periphery of the ribs or at spaces intermediate the ribs, as disclosed in my aforesaid application Serial No. 36,914, have been illustrated herein, it is to be expressly understood that the embodiments selected for illustration herein are to be taken only as typical of other forms and arrangements which may be used, and that any of the forms and arrangements of bearing shell and mounting means therefor within the disclosure of my aforesaid application may be employed in embodying the present invention as will be apparent from a consideration of the illustrative embodiments herein to be discussed in detail.

Referring first to the embodiment of Figs. 1 to 8 inclusive, shaft 15 is provided with a radial bearing having a shell which is preferably composed of a pair of half shells 16 and 17 which may be bolted or otherwise suitably secured together, said bearing shell halves being shown as suitably faced with bearing metal 18 which may be grooved in any suitable way to facilitate the proper distribution of lubricating oil with respect to the bearing surfaces and the maintenance of the desired oil film therebetween. In the preferred embodiment of the present invention said bearing shell halves 16 and 17 are duplicates, so that they may be interchanged, manufacturing operations are simplified and, in the event of need for replacement, but one form of bearing shell half is required.

Also, in the preferred embodiment, said bearing shell is also provided with a plurality of circumferentially extending ribs, here shown as four in number 19, 20, 21 and 22, which are spaced axially by regions 23, 24 and 25 which are of such radial dimension or thickness that the shell is possessed of axial flexibility owing to these interrib sections, while the shell is rendered relatively stiff and rigid in a circumferential direction because of said axially spaced circumferentially extending ribs, so that substantial distortion of said shell other than by axial flexing thereof is prevented. As disclosed in my application Serial No. 36,914, the number of ribs may be varied, depending upon the length of the shell, etc., and said shell may be mounted with its ribs in direct contact with the mounting means, in which event the surfaces of engagement between the mounting means and the rib or ribs may be cylindrical, as in Fig. 10, or spherical, as in Fig. 9, or as illustrated in Fig. 1 a saddle ring 26, preferably made in halves bolted or otherwise suitably secured together, may be interposed between the shell and mounting means, said saddle ring tightly engaging said shell at the periphery of one or more ribs, or the engagement of the saddle ring with the shell may be at the interrib portions as disclosed in my aforesaid application, and preferably having a spherical surface 27 concentric with the axis of the shaft and adapted to cooperate with a corresponding spherical surface on the mounting to be described so as to provide a sufficiently free fit for relative self-aligning movements.

Figure 10:
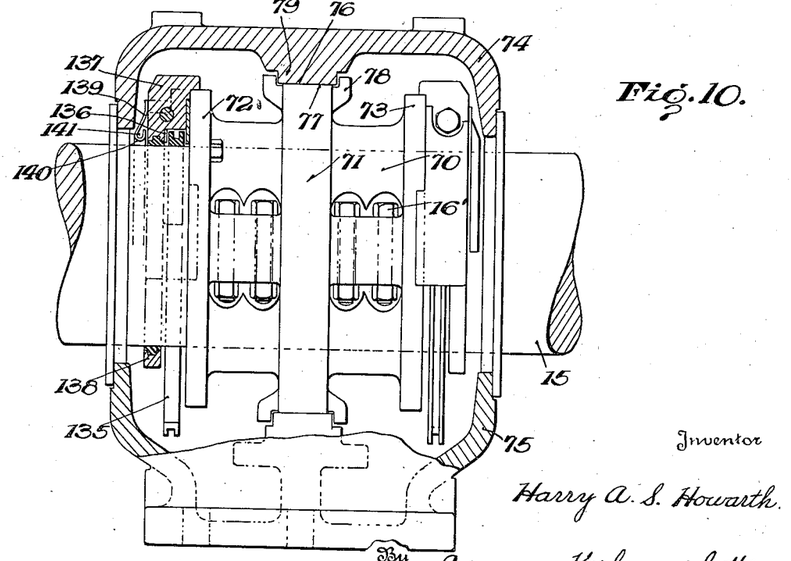
Fig. 10 is an axial section of yet another embodiment of the present invention.
Figure 11:
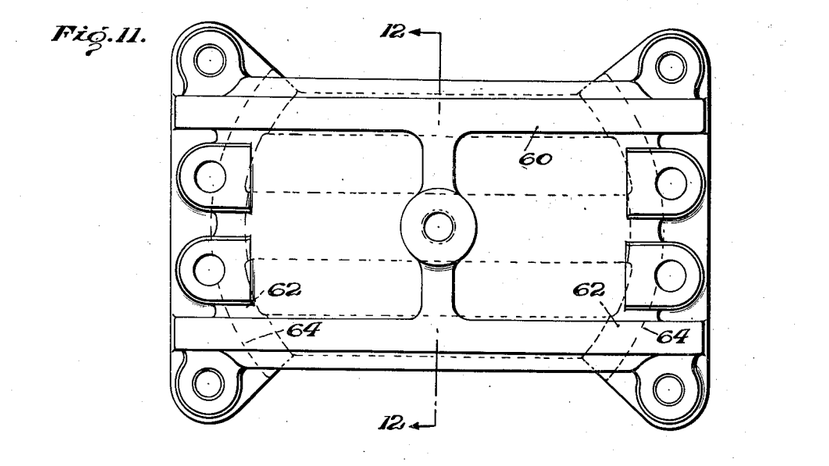
Figs. 11 and 12 are respectively a plan view and an end view, partly in section on line 12—12 of Fig. 11, of the cap member of the mounting shown in Fig. 9.
Figure 12:
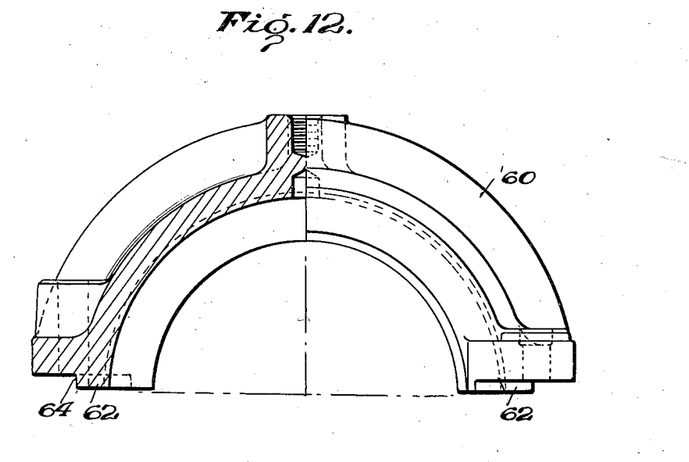
Figure 13:
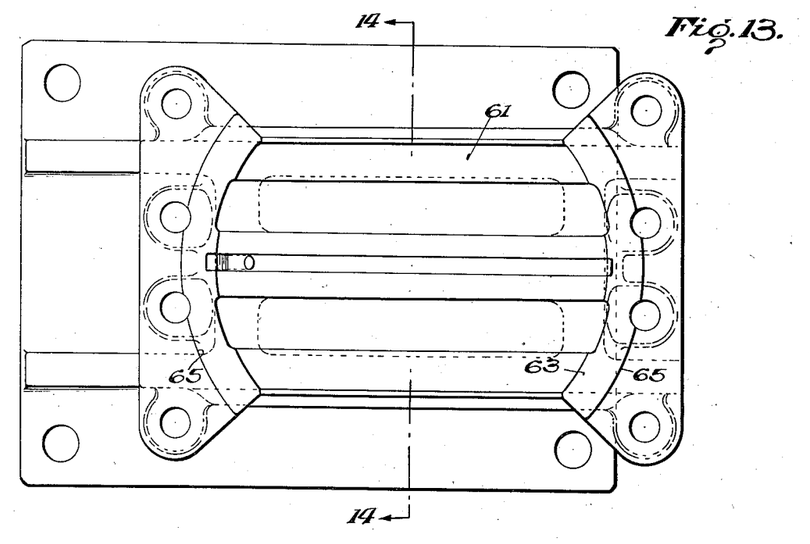
Figs. 13 and 14 are respectively a plan view and an end view, partly in section on line 14—14 of Fig. 13, of the base member of the mounting shown in Fig. 9.
Figure 14:
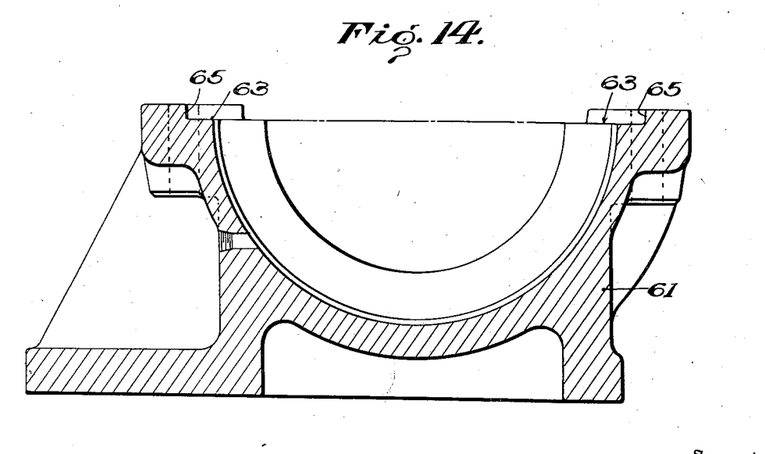

Relative movement between the bearing shell and the saddle ring 26 may be prevented in any suitable way as by one or more lugs, at one or both sides of the shell engaging corresponding recesses in the saddle (not shown) preferably at the plane of division between the halves of the shell and of the saddle ring, said lugs also preventing relative rotation between the shell and saddle ring. Where, as here, the halves of the mounting are separable at a horizontal plane, the plane of division between the halves of the bearing shell and the saddle ring when used is preferably disposed at a substantial angle to the horizontal, say 45° thereto, although if preferred the plane of division of the shell, and also of the saddle ring when used, may also lie in the horizontal plane. As shown in Fig. 10, the bolts 16' connecting the halves of the bearing shell are preferably disposed in the grooves constituted by the interrib portions, and one or more bolts may be used at each side of the shaft in each of said grooves. Thus in the embodiment of Fig. 1 wherein three interrib portions are employed the halves of the bearing shell may be connected by three bolts at each side of the shaft.

The mounting for the present invention is also made in halves and includes a cap member 28 and a base member 29, the latter being adapted to be attached to any suitable foundation in any suitable way. The two halves of the mounting as shown are connected by a suitable number of bolts 30 passed through the flanges 31 and 32 of said cap and base, some or all of said bolts being preferably fitted bolts. In the preferred arrangement four fitted bolts 30' are employed at the four corners of the mounting (see Figs. 3 and 5), while intermediate bolts connecting the halves of the mounting, as at apertures 33, which may be clearance bolts, may also be employed. Interiorly the cap and base members 28 and 29 are provided with a spherical surface 34 mating with the spherical surface 27 on the saddle ring 26, so that by the cooperation of said spherical surfaces 27 and 34 the saddle ring is free to tilt axially with respect to the mounting and thereby permit self-aligning movements of the shaft and its bearing shell, without flexure of the bearing shell, said bearing shell however being free to flex to the extent necessary to conform itself with the flexure of the shaft under the load imposed. To prevent relative rotation between the saddle ring 26 and the mounting therefor, said saddle ring may be provided with a transverse groove 35 in which fits the squared head 36 of a dowel pin 37 which has a close fit with its aperture 38 in the cap member 28 but which will, however, permit relative movement between the dowel pin and cap to the extent required by the self-aligning movements of the shaft as transmitted to the saddle ring 26.

Figure 1:
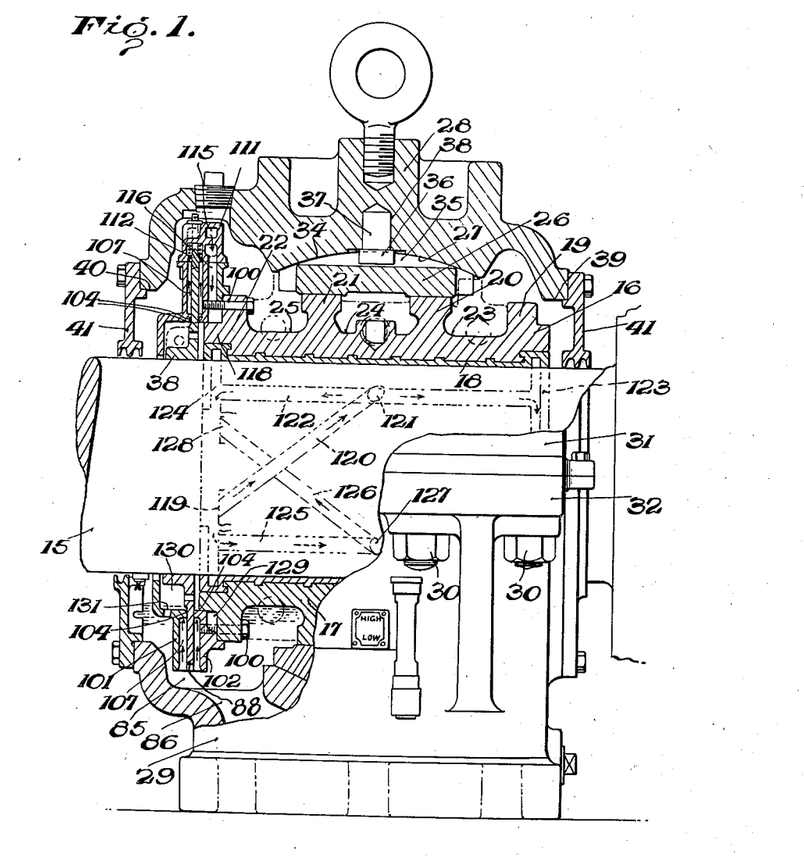
Fig. 1 is partly an elevation and partly in axial section of an embodiment of the present invention.
Figure 9:
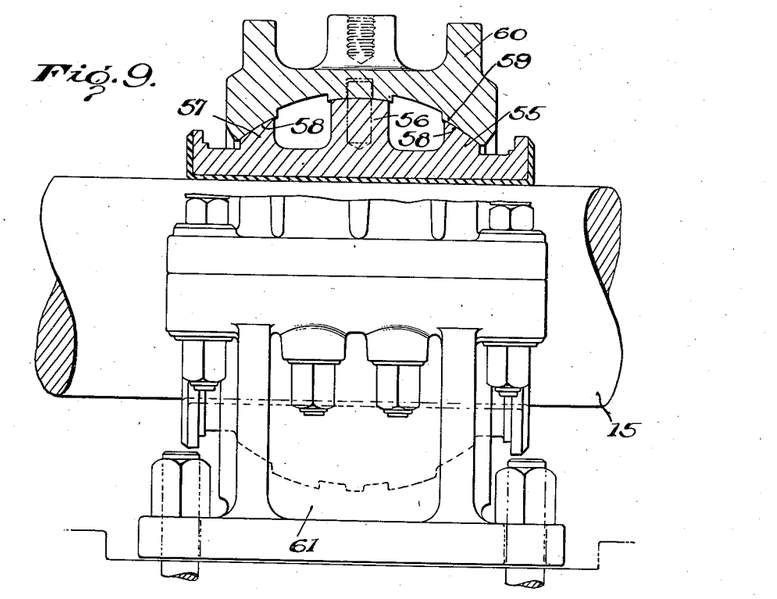
Fig. 9 is partly an elevation and partly an axial section of another embodiment of this invention.

As shown in the embodiment of Fig. 1, the mounting 28, 29 is non-symmetrical in a plane axially of the shaft, but if preferred the mounting halves may be made symmetrical in an axial direction whether or not lubricating means as hereinafter described are provided at both ends of the bearing shell. In the embodiment of Fig. 1 the mounting halves 28 and 29 extend a substantial distance beyond the end of the bearing shell in both directions and have relatively large bores 39 and 40 which are closed by cover members 41 of any suitable construction and provided with any suitable means as combs, wipers, etc., at the surface of the shaft for providing an oil-tight enclosure for the bearing shell. If such an oil-tight enclosure is not desired, the mounting halves may terminate short of the ends of the bearing shell, as shown in Fig. 9. The mounting halves may also be inwardly directed so as to provide bores whose diameters are but little larger than the shaft, as shown in Fig. 10, in which event any suitable form of closure means for the opening between the shaft and bore of the mounting halves may be used or not as desired.

Figure 3:
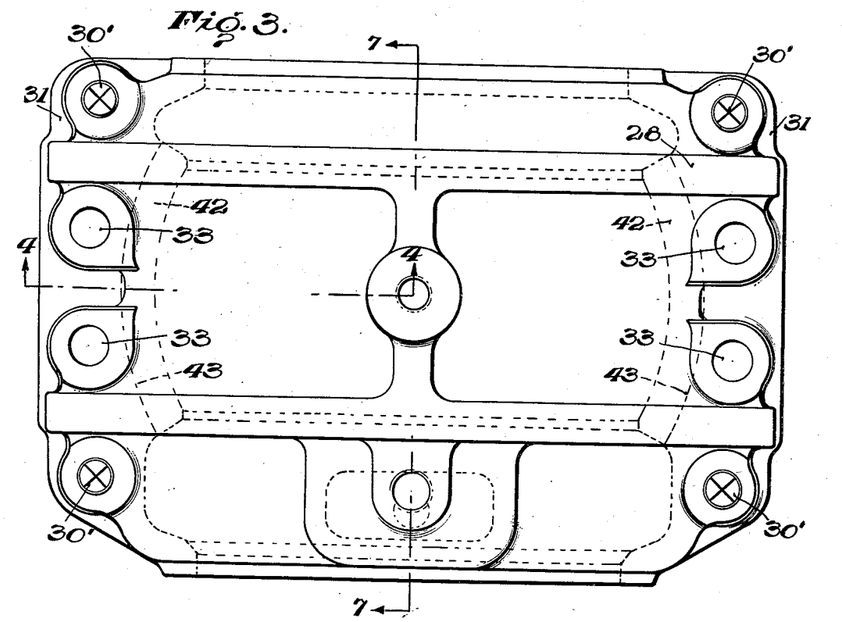
Figs. 3 and 4 are respectively a plan view and an end view, partly in section on the line 4—4 of Fig. 3, of the cap member of a mounting embodying the present invention.
Figure 4:
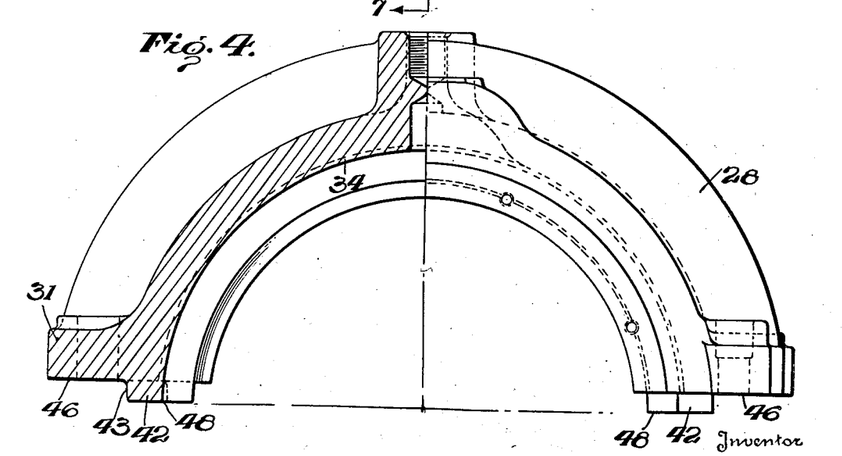
Figure 5:
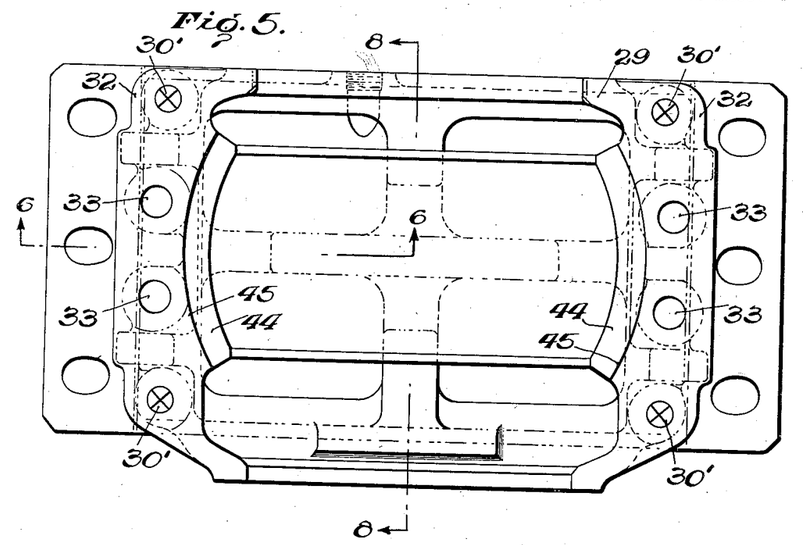
Figs. 5 and 6 are respectively a plan view and an end view, partly in section on the line 6—6 of Fig. 5, of the base member of the mounting whose cap is shown in Figs. 3 and 4, Figs. 5 and 6 being on a somewhat smaller scale than Figs. 3 and 4.
Figure 6:
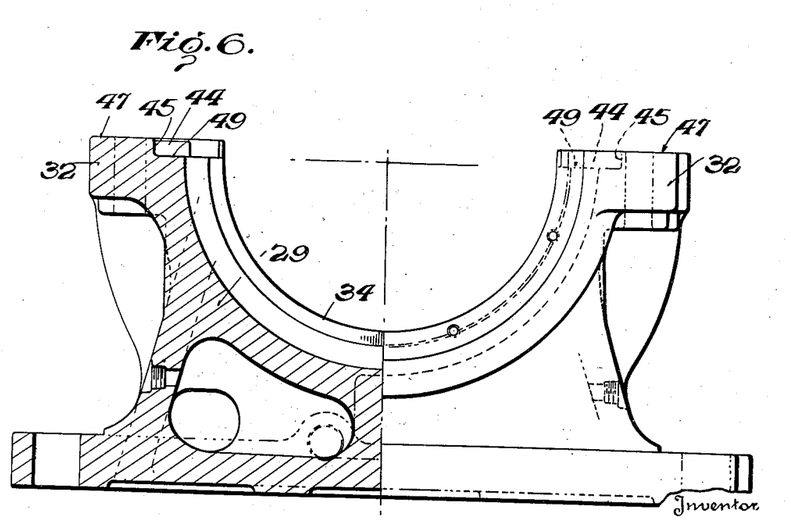
Figure 7:
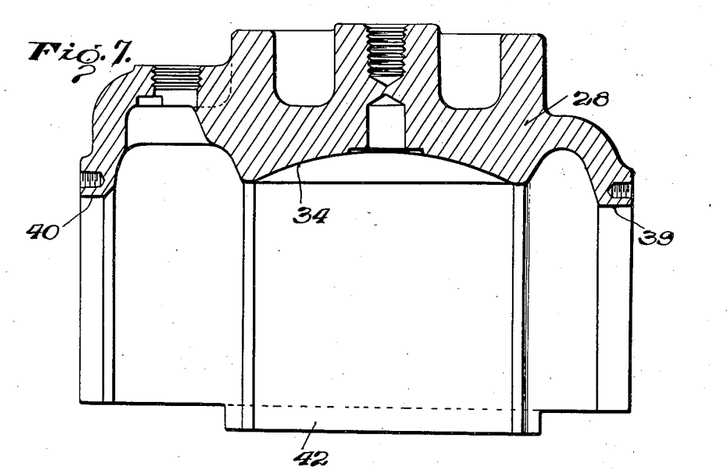
Figs. 7 and 8 are axial sections of the cap and base members of Figs. 3 to 6 inclusive, taken on lines 7—7 of Figs. 3 and 8—8 of Fig. 4, respectively.
Figure 8:
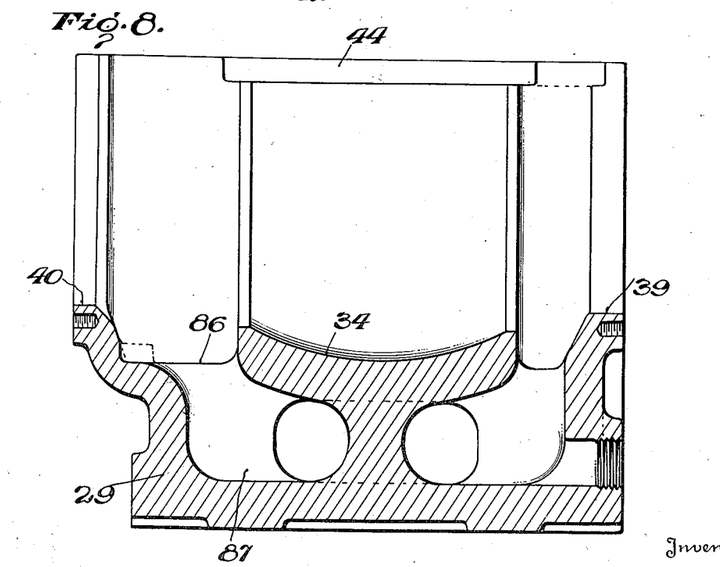

Referring now more particularly to Figs. 3 to 6 inclusive, the two halves of the mounting, 28 and 29, are provided with cylindrical surfaces of fit whose axis intersects with and is at right angles to the axis of the shaft, the axis of said cylindrical surfaces being here shown as vertical. The cap member 28 has at each side of the bore therethrough a segment of a cylindrical rib 42 having a cylindrical surface 43. Similarly, the base member 29 has at each side of the bore therethrough a segment of a cylindrical recess 44 having at its outer periphery a cylindrical surface 45 whose diameter conforms with the diameter of the surface 43 on the cap so that a cylindrical fit is made therebetween. The lower surfaces 46 of the flanges 31 on the cap and the upper surfaces 47 of the flanges 32 on the base of said mounting are preferably fitted scraped surfaces so as to make an oil-tight joint therebetween. The segments 42 preferably project beyond the surfaces 46 to an extent which is somewhat less than the depth of the recesses 44 as respects the surfaces 47, so that the under surfaces 48 of the projections do not contact the bottom surfaces 49 of the recesses 44. This is permissible because as shown in Figs. 3 and 5 the spaces between the surfaces 48 and 49 open interiorly of the base of the mounting and therefore they do not afford opportunity for leakage of oil outside of the mounting. Where, as illustrated, the surfaces 47 are somewhat above the horizontal plane through the axis of the shaft, the surfaces of contact of the two halves of the mounting are displaced vertically with respect to the horizontal plane through the axis of the shaft, but if preferred the surfaces of contact between the two halves of the mounting may be made to lie in the horizontal plane through the axis of the shaft. When, as preferred the cover members 41 are made in halves, their joints are out of alignment with the joints between the mounting halves, but this may be readily taken care of by beveling or otherwise suitably forming the halves.

The cylindrical fit thus provided between the cap and base of the mounting will hold the cap in position both laterally and axially, but some doweling is necessary to retain the mounting halves in line with the shaft. Preferably this doweling is combined with a general stiffening of the mounting so that both the strength of the cap and base may be taken advantage of. To this end fitted bolts are preferably employed, at least at the four corners of the mounting, as heretofore referred to, so that transverse loads applied to the cap, for example, will be transmitted to the base at both sides of the shaft. Thus suppose that a load is applied laterally to the saddle ring 26. So much of the load as is not transmitted directly to the base member is applied laterally to the cap member, and this part of the load will be transmitted to the base member from the cylindrical projection 42 on the cap member to the wall 45 of the recess 44 in the base member. Thus the entire load would under such circumstances be transmitted to the base. But if the load were of sufficient amplitude so as to tend to spring the base, the cap should preferably be so related to the base that part of the load will be transmitted to the other side of the shaft from that receiving the thrust at the surface 45, or in other words exert a pull upon the opposite side of the base. If the cap is fastened to the base by fitted bolts, the load on the cap is transmitted to the base at both sides of the shaft through the action of the bolts on that side of their openings in the base toward which the load is acting.

In order to preserve an oil-tight joint at the flanges between the cap and base, when they are bolted together, the cylindrical fit must be of such diameter that when machined it will not destroy the fit of the flanges. By making the mounting of relatively large diameter, a cylindrical fit as disclosed can be provided without destroying the oil-tight joint between the flanges 31 and 32 as will be apparent from a consideration of Figs. 3 to 8 inclusive. At the same time the construction disclosed provides a compact and axially short mounting for the radial bearing.

In the embodiment of Figs. 1 to 8, the mounting halves are shown as extending axially to a substantial extent beyond both ends of the bearing shell, such construction providing space for containing oiling means within the mounting, and at one or both ends of the shell, without reduction in the bearing area of the latter. However, if desired, the mounting may be made coextensive axially with the bearing shell or it may terminate short of the ends of the bearing shell, as shown in Fig. 9. In this embodiment the ribs 55, 56 and 57 on the bearing shell have their peripheries so curved in an axial direction that they lie in the surface of a single sphere, so that in place of a spherically faced saddle ring to obtain self-aligning movements as employed in the embodiment of Figs. 1 to 8 inclusive, the self-aligning movements of the shell within the mounting is obtained by reason of the coaction of the spherical surface 58 on said ribs with the mating and corresponding spherical surface 59 formed at the interior of the cap 60 and base 61. While three ribs have here been shown as providing the said spherical surface only two ribs need be used, or alternatively a larger number of ribs may be employed if preferred.

Figs. 11 to 14 inclusive, show the cap and base members of a mounting corresponding to the construction shown in Fig. 9, and as in the embodiment of Figs. 1 to 8 inclusive, the cap is provided at each side with depending projections 62 formed as segments of a cylinder having its center in the vertical plane passing through the axis of the shaft, and the base member 61 is provided with corresponding recesses 63, said projections and recesses having cylindrical surfaces 64 and 65, respectively, providing a cylindrical fit as described in conjunction with the embodiment of Figs. 1 to 8, inclusive. It will be noted that here again the bore through the mounting is made relatively large, and the joint provided at the coacting cylindrical surfaces opens interiorly of the mounting, but as the bearing shell extends beyond the ends of the mounting in this embodiment, the possibility of a leakage space between the surfaces at the cylindrical joint between the cap and the base is of no moment.

While it is preferred to employ a spherical surface between the mounting and the bearing shell or a saddle ring cooperating with ribs thereon, such is not essential in the broader aspects of the present invention, as the mounting may have cylindrical contact with a center rib on the bearing shell as illustrated in Fig. 10. In this embodiment the bearing shell 70 is provided with a center rib 71 and end ribs 72 and 73. The mounting, which is composed of a cap 74 and a base 75, has at its inner surface an axially narrow cylindrical surface 76 which engages the cylindrical surface 77 of the rib 71. Owing to the axially narrow extent of contact between the mounting members and said rib on the bearing shell some aligning movement of the shell with respect to the mounting may take place separately from the flexing of said shell as provided by the interrib spaces. In this embodiment the center rib 71 is shown as provided with laterally and radially extending projections 78 at both faces thereof, said projections being adapted to embrace the radially inward projection 79 which has the cylindrical surface 76, so that undue axial displacement between the shell and mounting is prevented.

Figure 2:
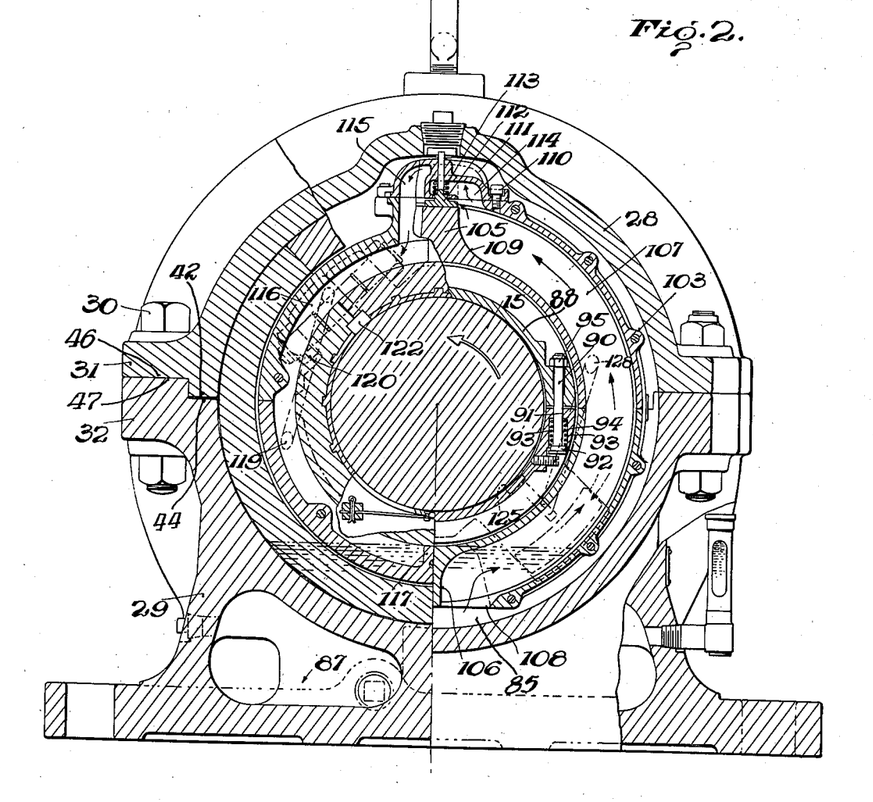
Fig. 2 is a sectional view, with different portions thereof taken on different planes at right angles to the axis of the shaft, to show various details of the construction of the embodiment of Fig. 1.

A bearing constructed in conformity with the present invention may be lubricated in any suitable way, as by one or more ring oilers disposed midway of the length of or at or adjacent one or both ends of the bearing shell (see Fig. 10), whether within the confines of the shell in an axial direction or exteriorly thereof, or the lubrication may be effected by pressure oiling (see Fig. 9), by disk oiling, or in any other suitable way. Disk oiling means at one end of the bearing shell is shown in Figs. 1 and 2 and ring oiling means disposed at both ends of the bearing shell are shown in Fig. 10. While the details of the oil collecting and distributing means per se form no part of the present invention, but are embraced within the subject matter of another application copending herewith, Serial No. 173,918, filed Nov. 10, 1937, and entitled Lubricator for journal bearings, the present invention involves, in combination with features heretofore discussed, lubricating means which may be disposed within such a mounting as heretofore described without decreasing the bearing surface area or the load-sustaining capacity of the radial bearing shell, and which may also be supported from or mounted on said bearing shell at one or both ends thereof. As the lubricating means may be provided at either or both ends of the bearing as preferred the mounting means may be made symmetrical with respect to an axial plane, or if the lubricating means is to be applied at one end only, a chamber for the lubricating means may be provided at one end only as shown in Fig. 1.

Referring to Figs. 1 and 2 the lubricating means is shown as of the disk oiling type and, as here illustrated, the mounting cap and base are suitably formed so as to provide a chamber 85 in which the lubricating means is disposed. Said chamber may communicate through one or more apertures 86 with spaces 87 within the base member and constituting a reservoir for the oil. Mounted on the shaft adjacent the end of the bearing shell is a disk 88 preferably made in halves which are suitably bolted together. If preferred, the two halves of the disk may be resiliently urged into gripping contact with the shaft as by providing one or more bolts 90 (see Fig. 2) which pass through aligned openings 91 in suitable flanges on the disk halves, each bolt being provided at one end thereof with a head 92 which cooperates with a coil spring 93 retained in a socket 94, said coil spring 93 reacting between the bottom of said socket and said head 92 to urge the ring halves into gripping relationship with the shaft. A nut 95 at the opposite ends of the bolt may be adjusted to predetermine the tension of the spring 93.

Mounted on the end of the bearing shell as by bolts or screws 100, whose heads may be conveniently disposed within the interrib space 25, is a stationary disk housing composed of halves 101 and 102 disposed at opposite faces of the disk 88, said halves being suitably secured together as by bolts through aligned and apertured lugs 103 on said housing halves. Said housing halves are so formed interiorly as to closely embrace said disk adjacent the inner periphery thereof as shown at 104 and to form with the opposite faces of said disk certain passages hereinafter referred to more in detail. At each face of the disk, said housing member is provided with inwardly directed lugs 105 and 106 (see right half of Fig. 2) so that separate channels are formed on opposite sides of the vertical plane containing the axis of the shaft as well as at opposite faces of the disk, i. e., four in number. Thus, referring to the right half of Fig. 2, wherein the channel 107 is illustrated as extending approximately 180° at one side of the disk 88 and from the lug 106 to lug 105, said channel 107 has an inlet opening 108 adjacent the lowermost portion thereof so that oil may flow into said channel from the space 85 when the shaft is rotating in an anticlockwise direction as illustrated by the arrow in Fig. 2. Oil flowing through the inlet aperture 108 will contact the rotating face of the disk 88 and be carried upwardly thereby through the axially narrow channel 107 until it is deflected radially by the curved surface 109 of lug 105.

Mounted on the disk housing in any suitable way, as by bolts or screws 110, is a cover 111 containing suitable passages for receiving the oil removed from the face of the rotating disk and conveying it to suitable channels for distribution to the bearing surfaces as hereinafter explained. To remove oil also from the periphery of the disk an oil scraping member 112, having an axial width substantially equal to that of the disk, is mounted in the cover 111 and is resiliently pressed by a coil spring 113, reacting between a flange on said scraper and a wall of said cover, into contact with the periphery of the disk.

The oil removed from the disk, as from channel 107 by oil deflecting edge 109, is deflected into a passage 114 in said cover 111 and thence into a passage 115 in said cover, which passage leads to a channel at the opposite side of lug 105 but which may be at the same or the opposite face of said disk. One or the other of these arrangements may be preferable for certain dispositions of the load with respect to the upper or lower half of the bearing shell, when taken into consideration with the direction of rotation of the shaft, so that the oil removed from the rotating disk will be delivered in copious quantities directly to the groove or grooves which feed the load-supporting film. As here illustrated, the oil is removed from the channel 107 which is at the left of the rotating disk as viewed in Fig. 1, and the passages 114, 115, are disposed diagonally with respect to the cover, so that the oil is delivered to a passage 116 which is within said disk housing and to the right of the disk as viewed in Fig. 1 (see also left-hand half of Fig. 2). Oil flowing downwardly within said passage 116 is confined therein by a lug 117 (see left-hand half of Fig. 2), here shown as cooperating with an axially extending flange 118 on the bearing shell, so that the oil collected in said passage 116 may flow therefrom through opening 119 to a passage 120, which is inclined upwardly (see Fig. 1) and delivers the oil through passage 121 to an axially extending groove 122. As heretofore explained, the radial bearing surfaces may be provided with grooving of any suitable character, arrangement and configuration. As here illustrated, the groove 122 leads to the oil sealing grooves 123 and 124 at the axially opposite extremities of the radial bearing surface, and oil flows from the radial bearing to an axially extending groove 125 from which leads passage 126, communicating with groove 125 through passage 127, that delivers the oil through an opening 128 into a passage 129 which is disposed at the opposite side of the shaft from passage 116. Thence the oil returns to the chamber through other diagonal passages in the cover 111 and the channel 130 at the opposite side of the shaft from channel 107. If the direction of the shaft is reversed the flow through the foregoing passages is reversed, as is apparent, the oil being withdrawn from the face of the disk at the channel 130 at the left-hand side of the shaft, as viewed in Fig. 2, delivered by the passages in the cover to channel 129, whence it may flow through aperture 128, and passages 126 and 127 to groove 125 for delivery to the oil sealing grooves 123, 124, the oil leaving the radial bearing through groove 122, passages 121 and 120, aperture 119, passage 116 and channel 107. Drainage apertures, as at 131, may also be provided for other chambers within the disk housing.

As heretofore noted, it is sometimes desirable to deliver the oil to a passage at the same side of the disk as that from which the oil is withdrawn from the disk so that the direction of flow to and through the radial bearing will be that which is best for the direction of load thereon, in which event the cover may be provided with suitable passages for delivering the oil removed from the disk in channel 107 directly to passage 129, for example, so that the oil will be delivered to groove 125 even though the direction of rotation of the shaft is anti-clockwise. Also, as will be apparent, the passages in the cover may be provided with a ball valve or other suitable means operated by the oil for closing off the passages at the suction side of the disk so that the oil may be forced under pressure to the grooves of the radial bearing.

In Fig. 10 ring oiling means are shown in place of disk oiling means as above described, and in this embodiment the ring oiling means are disposed at both extremities of the radial bearing shell, although a ring oiler at only one end may be used if preferred. As here illustrated each ring oiler 135 is disposed within a cavity 136 of a housing member 137 suitably supported from the flange 72 of the bearing shell. Any suitable system of passages or grooving may be associated with the ring oiler 135 to properly distribute the oil with respect to the radial bearing surfaces; thus one or two passages may lead from each oiler to appropriate portions of such grooving as shown in Figs. 1 and 2.

As illustrated, the cavity 136 is closed at its outer side by an oil retaining ring 138, preferably made in halves, and to prevent oil being thrown onto the wall of the mounting in the upper half of the bearing, with the consequent tendency of the oil to drop onto the shaft and escape from the mounting, a semi-circular guard 139 may be suitably attached to the member 137, the same being shown as provided with an axially inclined wall terminating at its radially inner extremity in a curved portion 140 which provides a channel 141 through which any oil received by the inclined wall 139 and flowing to said channel will flow downwardly past the horizontal plane of the axis and thereby be returned to the cavities in the mounting base without dropping onto the shaft.

It will therefore be perceived that by the present invention improved mounting means for radial bearings have been provided, and which mounting means are of particular utility for use in conjunction with radial bearing shells of the type employing axially spaced circumferentially rigid ribs so that the shell is possessed of axial flexibility, although the same is rigid circumferentially. Moreover, this is true whether the ribs on the shell cooperate directly with the mounting means, either through cylindrical or spherical surfaces of contact, or a saddle ring is interposed between the ribs on the shell and the mounting means, either with cylindrical or spherical surfaces of contact with either or both. Hence standardization of bearings of this character is facilitated. At the same time the manner of housing and supporting the bearing shell is such that the two halves of the bearing shell may readily be made as duplicates, and therefore, both as respects manufacturing operations and as respects the provision of spare parts, but one form of bearing shell half need be provided. The present invention also facilitates the copious lubrication of a radial bearing at either or both ends thereof without diminishing the radial bearing area or the load-sustaining capacity of the bearing.

The present invention also provides improved means for so relating the cap and base of the mounting means that relative movement therebetween is prevented, and at the same time the entire structure is strengthened and made more rigid. The load on the cap may also be transmitted to the base with minimum likelihood of the mounting being distorted or sprung out of its proper shape. The cylindrical surfaces of interengagement between the cap and base members of the mounting may be employed without interfering with the maintenance of oil-tight joints between the flanges of the mounting means, and at the same time the bearing may be made relatively short and compact in an axial direction. The mounting means may be readily made into an oil-tight enclosure by suitable cover members secured in the apertures at the extremities of the bore of a mounting means, and these cover members may be suitably formed to cooperate with the shaft so as to prevent escape of oil along the shaft. Inasmuch as the cylindrical surfaces of interaction between the cap and base members do not extend into the extremities of the bore, there is no danger of leakage along these surfaces.

While the embodiments of the invention illustrated on the drawings have been described with considerable particularity, it is to be expressly understood that the invention is not restricted thereto, as the invention is capable of receiving a variety of mechanical expressions, some of which will now readily suggest themselves to those skilled in the art, while changes may be made in the details of construction, arrangement, proportion, etc., of parts, and certain features used without other features, without departing from the spirit of the invention. While particular reference has herein been made to the lubricating means, to illustrate how the present invention facilitates the provision of lubricating means at one or both extremities of the radial bearing without diminution of the load-sustaining capacity of the radial bearing, it is to be expressly understood that the lubricating means per se is not claimed herein, except in combination with other features of the present invention, but the same is reserved as subject matter for a separate application. Reference is therefore to be had to the appended claims for a definition of the invention.

What is claimed is:

1. In a radial bearing, in combination with a radial bearing shell provided with circumferentially extending ribs, a mounting for said shell including base and cap members, said mounting cooperating with the peripheral surface of one or more of the ribs of said shell, whereby said shell is mounted to flex axially, being supported only where the shell is circumferentially rigid, and said cap and base members having cylindrical surfaces of engagement whose axis is angularly related to the axis of the shell and which surfaces are adapted to transmit load and prevent relative axial and transverse movements between said cap and base members.

2. In a radial bearing, in combination with a radial bearing shell provided with circumferentially extending ribs, a mounting for said shell including base and cap members, said mounting cooperating with the peripheral surface of one or more of the ribs of said shell, whereby said shell is mounted to flex axially, being supported only where the shell is circumferentially rigid, and said cap and base members having cylindrical surfaces of engagement to transmit load and prevent relative axial and transverse movements between said cap and base members, the axis of said cylindrical surfaces being at right angles to the axis of the bearing.

3. In a radial bearing, in combination with a radial bearing shell provided with circumferentially extending ribs, a mounting for said shell including base and cap members, said mounting cooperating with the peripheral surface of one or more of the ribs of said shell, whereby said shell is mounted to flex axially, being supported only where the shell is circumferentially rigid, and said cap and base members having cylindrical surfaces of engagement whose axis is angularly related to the axis of the shell and which surfaces are adapted to transmit load and prevent relative axial and transverse movements between said cap and base members, the joint between said cylindrical surfaces opening interiorly of the bore provided by said cap and base members, and means carried by one or both ends of said cap and base members to prevent escape of oil from the interior of said cap and base members.

4. In a radial bearing, in combination with a bearing shell provided with circumferentially extending ribs, a mounting for said shell including cap and base members cooperating with the peripheral surface of one or more of the ribs of said shell whereby said shell is mounted to flex axially, being supported only where the shell is circumferentially rigid, and said cap and base members being provided with interengaging cylindrically shaped ribs and recesses whose axis is angularly related to the axis of the shell and which ribs and recesses are adapted to transmit load from said cap member to said base member.

5. In a radial bearing, in combination with a bearing shell provided with circumferentially extending ribs, a mounting for said shell including cap and base members, said mounting cooperating with the peripheral surface of one or more of the ribs of said shell whereby said shell is mounted to flex axially, being supported only where the shell is circumferentially rigid, and said cap and base members being provided with interengaging cylindrically shaped ribs and recesses whose axis is angularly related to the axis of the shell and which ribs and recesses are adapted to transmit load from said cap member to said base member, and fitted bolts connecting said cap and base members whereby the load on said cap member is transmitted to both sides of said base member.

6. In a radial bearing, in combination with a radial bearing shell provided with circumferentially extending ribs, a mounting for said bearing shell including a cap member and a base member having cylindrical surfaces of interengagement whose axis is angularly related to the axis of said shell, and means between said shell and said cap and base members providing a support for said shell at the periphery of one or more of said ribs and also providing for movement of said shell with respect to said cap and base members.

7. In a radial bearing, in combination with a radial bearing shell provided with circumferentially extending ribs, a mounting for said bearing shell including a cap member and a base member having cylindrical surfaces of interengagement whose axis is angularly related to the axis of said shell, said ribs on said shell having their peripheries lying in a spherical surface whose center is at the axis of the radial bearing and said cap and base members having a mating spherical surface cooperating with the spherical surface on said ribs to provide aligning movements for said bearing shell.

8. In a radial bearing, in combination with a radial bearing shell provided with circumferentially extending ribs, a mounting for said bearing shell including a cap member and a base member having cylindrical surfaces of interengagement whose axis is angularly related to the axis of said shell, said cap and base members and said bearing shell having cylindrical surfaces of engagement.

9. In a radial bearing, in combination with a radial bearing shell provided with circumferentially extending ribs, a mounting for said bearing shell including a cap member and a base member having cylindrical surfaces of interengagement whose axis is angularly related to the axis of said shell, and a saddle ring interposed between said shell and said cap and base members and providing for movement of said shell with respect to said cap and base members.

10. In a radial bearing, in combination with a radial bearing shell provided with circumferentially extending ribs, a mounting for said bearing shell including a cap member and a base member having cylindrical surfaces of interengagement whose axis is angularly related to the axis of said shell, and a saddle ring interposed between said shell and said cap and base members, said saddle ring and said cap and base members having spherical surfaces of engagement and said saddle ring engaging said shell at the periphery of one or more of said ribs.

11. In a radial bearing, the combination of a radial bearing shell having one or more circumferential ribs and a mounting therefor including a saddle ring cooperating with the periphery of one or more of said ribs and a cap member and a base member cooperating with said saddle ring and having opposed flanges adapted to be secured together, said cap and base members also having cylindrical interengaging surfaces whose axis is angularly related to the axis of the shell and which surfaces are adapted to prevent transverse and axial relative movements between said cap and base members.

12. In a radial bearing, the combination of a radial bearing shell having one or more circumferential ribs and a mounting therefor including a saddle ring cooperating with the periphery of one or more of said ribs and a cap member and a base member cooperating with said saddle ring and having opposed flanges adapted to be secured together, said cap and base members also having cylindrical interengaging surfaces to prevent transverse and axial relative movements between said cap and base members, the axis of said cylindrical surfaces being at right angles to the axis of the bearing.

13. In a radial bearing, the combination of a radial bearing shell having one or more circumferential ribs and a mounting therefor including a saddle ring cooperating with the periphery of one or more of said ribs and a cap member and a base member cooperating with said saddle ring and having opposed flanges adapted to be secured together, one of said members having cylindrically faced segments and the other of said members having cylindrically faced recesses at opposite sides of the axis of the mounting, said cylindrically faced segments and recesses adapted to engage at cylindrical surfaces whose axis is angularly related to the axis of the shell and prevent transverse and axial displacements of the cap with respect to the base member.

14. In a radial bearing, the combination of a bearing shell having one or more circumferential ribs, a mounting therefor including a saddle ring cooperating with the periphery of one or more of said ribs and a cap member and a base member cooperating with said saddle ring and having cylindrical surfaces of engagement whose axis is angularly related to the axis of the shell and which are at opposite sides of the bore through said mounting, the joint between said cylindrical surfaces opening into the bore of said mounting, and means carried by one or both ends of said cap and base members to constitute an oil-tight enclosure for said bearing shell.

15. In a radial bearing, the combination of a bearing shell having one or more circumferential ribs, a mounting therefor including a saddle ring cooperating with the periphery of one or more of said ribs and a cap member and a base member cooperating with said saddle ring and having cylindrical means of interengagement whose axis is angularly related to the axis of the shell for transmitting load from said cap member to said base member, the end of said cap and base members being enlarged to provide a chamber, means closing the end of said chamber for preventing escape of oil, and oiling means supported by said bearing shell within said chamber.

16. In a radial bearing, the combination of a bearing shell composed of duplicated halves and a mounting for said bearing shell including a cap member and a base member having cylindrical surfaces of interengagement whose axis is angularly related to the axis of the shell, said bearing shell being axially flexible and having outwardly extending circumferentially extending ribs whereby it is circumferentially rigid and said cap and base members cooperating with the periphery of one or more of said ribs to support said bearing shell within said mounting.

17. In a radial bearing, the combination of a bearing shell composed of duplicated halves and a mounting for said bearing shell including a cap member and a base member having cylindrical surfaces of interengagement whose axis is angularly related to the axis of the shell, said bearing shell being axially flexible and having outwardly extending circumferentially extending ribs whereby it is circumferentially rigid and said ribs and said mounting having spherical surfaces of engagement to mount said shell for self-aligning movements.

18. In a radial bearing, the combination of a bearing shell composed of duplicated halves and a mounting for said bearing shell including a cap member and a base member having cylindrical surfaces of interengagement whose axis is angularly related to the axis of the shell, said bearing shell being axially flexible and having outwardly extending circumferentially extending ribs whereby it is circumferentially rigid and the inner surface of said cap and base members engaging the periphery of one or more of said ribs to mount said shell centrally within said mounting.

19. In a radial bearing, the combination of a bearing shell composed of duplicated halves, a mounting for said bearing shell including a cap member and a base member having cylindrical surfaces of interengagement whose axis is angularly related to the axis of the shell, said bearing shell having a plurality of outwardly extending circumferentially extending ribs, and a saddle ring cooperating with the periphery of one or more of said ribs and mounted in said cap and base members.

20. In a radial bearing, the combination of a bearing shell composed of duplicated halves, a mounting for said bearing shell including a cap member and a base member having cylindrical surfaces of interengagement whose axis is angularly related to the axis of the shell, said bearing shell having a plurality of outwardly extending circumferentially extending ribs, a saddle ring cooperating with the periphery of one or more of said ribs and mounted in said cap and base members, said saddle ring and said cap and base members having spherical surfaces of engagement.

21. In a radial bearing, the combination of a bearing shell composed of duplicated halves, a mounting for said bearing shell including a cap member and a base member having cylindrical surfaces of interengagement whose axis is angularly related to the axis of the shell, said bearing shell having circumferentially extending ribs, a saddle ring cooperating with said ribs and mounted in said cap and base members, said saddle ring and said cap and base members having spherical surfaces of engagement and said saddle ring having cylindrical surfaces of contact with the periphery of two of said ribs.

22. In a radial bearing, the combination of a bearing shell composed of duplicated halves, a mounting for said bearing shell including a cap member and a base member having cylindrical surfaces of interengagement whose axis is angularly related to the axis of the shell, said bearing shell having circumferentially extending ribs with the periphery of which said cap and base members cooperate, said cap and base members providing a chamber between the end of said shell and the end of said cap and base members, and lubricating means mounted in said chamber and supported on the end of said shell.

23. In a radial bearing, in combination with a bearing shell, a mounting for said shell including a base member and a cap member separable from said base member, said cap and base members having interengaging cylindrical surfaces whose axis is at right angles to the axis of the shell for transmitting load from said cap member to said base member, said bearing shell having circumferentially extending ribs, and a saddle ring mounted in and movable with respect to said cap and base members and cooperating with the periphery of one or more of said ribs to support said bearing shell.

24. In a radial bearing, in combination with a bearing shell, a mounting for said shell including a base member and a cap member separable from said base member, said cap and base members having interengaging cylindrical surfaces whose axis is at right angles to the axis of the shell for transmitting load from said cap member to said base member, and a saddle ring interposed between said shell and said mounting and movable with respect to said cap and base members to provide self-aligning movements of said shell with respect to said mounting.

25. In a radial bearing, in combination with a radial bearing shell provided with circumferentially extending ribs, a mounting for said bearing shell including a cap member and a base member having cylindrical surfaces of interengagement whose axis is angularly related to the axis of said shell, said mounting cooperating with said bearing shell at the periphery of one or more of said ribs and having intermediate said bearing shell and said cap and base members coacting spherical surfaces whereby said shell may have aligning movement with respect to said cap and base members.

HARRY A. S. HOWARTH.